United States Patent
Schriber et al.

(10) Patent No.: US 11,721,081 B2
(45) Date of Patent: *Aug. 8, 2023

(54) VIRTUAL REALITY EXPERIENCE SCRIPTWRITING

(71) Applicant: DISNEY ENTERPRISES, INC., Burbank, CA (US)

(72) Inventors: Sasha Anna Schriber, Zürich (CH); Isa Simo, Zürich (CH); Merada Richter, Zürich (CH); Mubbasir Kapadia, Zürich (CH); Markus Gross, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,842

(22) Filed: Feb. 20, 2020

(65) Prior Publication Data

US 2020/0193718 A1  Jun. 18, 2020

Related U.S. Application Data

(63) Continuation of application No. 15/627,397, filed on Jun. 19, 2017, now Pat. No. 10,586,399.

(60) Provisional application No. 62/484,863, filed on Apr. 12, 2017.

(51) Int. Cl.
| | |
|---|---|
| *G06T 19/20* | (2011.01) |
| *G06T 13/40* | (2011.01) |
| *G06F 40/166* | (2020.01) |
| *G06F 3/0484* | (2022.01) |
| *G06F 3/04815* | (2022.01) |

(Continued)

(52) U.S. Cl.
CPC ............ *G06T 19/20* (2013.01); *G06F 40/166* (2020.01); *G06T 13/40* (2013.01); *G06F 3/0484* (2013.01); *G06F 3/04815* (2013.01); *G06F 40/205* (2020.01); *G06F 40/226* (2020.01)

(58) Field of Classification Search
CPC .... G06F 40/205; G06F 3/04815; G06T 19/20
See application file for complete search history.

(56) References Cited

U.S. PATENT DOCUMENTS 8,443,284 B2 * 5/2013 Lindley ................. G11B 27/34
  715/704
2006/0217979 A1 9/2006 Pahud et al.
(Continued)

*Primary Examiner* — Ryan McCulley
(74) *Attorney, Agent, or Firm* — Artegis Law Group, LLP

(57) ABSTRACT

Systems and methods are provided for a workflow framework that scriptwriters can utilize when developing (live-action/animation/cinematic) virtual reality (VR) experiences or content. A script can be parsed to identify one or more elements in a script, and a VR representation of the one or more elements can be automatically generated. A user may develop or edit the script which can be presented in a visual and temporal manner along with the VR representation. The user may edit the VR representation, and the visual and temporal presentation of the script can be commensurately represented. The script may be analyzed for consistency and/or cohesiveness in the context of the VR representation or experience. A preview of the VR experience or content can be generated from the script and/or the VR representation.

20 Claims, 11 Drawing Sheets

(51) Int. Cl.
*G06F 40/205* (2020.01)
*G06F 40/226* (2020.01)

(56) References Cited

U.S. PATENT DOCUMENTS

| | | |
|---|---|---|
| 2009/0024963 A1* | 1/2009 | Lindley .............. H04N 5/23222 |
| | | 715/839 |
| 2009/0219291 A1 | 9/2009 | Lloyd et al. |
| 2009/0300515 A1 | 12/2009 | Min et al. |
| 2010/0118036 A1 | 5/2010 | Kim |
| 2010/0259545 A1 | 10/2010 | Elnatan |
| 2011/0187706 A1 | 8/2011 | Vesely et al. |
| 2013/0093774 A1 | 4/2013 | Sridhar |
| 2013/0132835 A1* | 5/2013 | Goldenberg ............ G06T 13/20 |
| | | 715/716 |
| 2014/0160134 A1* | 6/2014 | Bekmambetov ...... G06T 11/206 |
| | | 345/473 |
| 2015/0229838 A1 | 8/2015 | Hakim et al. |
| 2016/0027198 A1 | 1/2016 | Terry et al. |
| 2016/0180601 A1 | 6/2016 | Park et al. |
| 2017/0124733 A1 | 5/2017 | Boss et al. |
| 2017/0206707 A1* | 7/2017 | Guay .................. G06F 16/2246 |
| 2018/0018803 A1 | 1/2018 | Bruner et al. |
| 2018/0197324 A1 | 7/2018 | Hanamoto |

* cited by examiner

VIRTUAL REALITY EXPERIENCE SCRIPTWRITING

This application is a continuation of the co-pending U.S. patent application titled, "VIRTUAL REALITY EXPERIENCE SCRIPTWRITING", filed on Jun. 19, 2017 and having Ser. No. 15/627,397, which claims the priority benefit of U.S. provisional patent application titled, "VIRTUAL REALITY EXPERIENCE SCRIPTWRITING", filed Apr. 12, 2017 and having Ser. No. 62/484,863. The subject matter of these related applications is hereby incorporated herein by reference.

TECHNICAL FIELD

The present disclosure relates generally to virtual reality (VR) content or experiences, and more particularly, to the development of VR content or experiences using a toolset that allows a script to be parsed and analyzed to generate a two-dimensional (2D)/three-dimensional (3D) overview, and/or a 3D preview.

DESCRIPTION OF THE RELATED ART

VR can refer to the creation of a fully immersive virtual world/space experience that users may interact with. Increased interest in VR as an industry and the improvements made in VR technology have expanded traditional boundaries of storytelling. However, traditional scriptwriting tools are not well-suited to the creation of VR content due to the various complexities associated with the more immersive environment realized with VR content. For example, in a VR world or space, there are more dimensions to consider, i.e., it is possible to experience content 360 degrees about a user. This is in contrast to 2D content, where a user typically experiences content in, at most, a 180 degree space in front of the user.

The sense of space and presence achieved with VR content can draw viewers into a story more completely. However, producing VR content involves the careful use of sound, light, and movement to maintain viewers' interest, as well as to present a cohesive VR experience. Because of these considerations, it can be difficult to visualize a creative concept for a virtual space as opposed to that of a traditional 2D screen. It is also harder to communicate complex ideas to other members of a production team when producing VR content. As a result, numerous (expensive) rehearsals may be needed with most of the team present before shooting a scene even begins.

BRIEF SUMMARY OF THE DISCLOSURE

In some embodiments, a computer-implemented method may comprise parsing metadata from a script, and presenting a virtual reality (VR) environment as part of an interactive user interface (UI) in which a VR experience is modeled commensurate with the metadata. The method may further comprise receiving interactive input affecting at least one of the script and the VR environment, adapting the VR environment commensurate with the received interactive input, and generating a three-dimensional (3D) preview of the VR experience.

The parsing of the metadata from the script may comprise identifying text of the script and correlating the identified text to one or more of a character, an action, and a location relevant to a scene of the script. In some embodiments, the parsing of the metadata may comprise building relationships between one or more aspects or elements represented within the script.

In some embodiments, the script can be visually presented in a layout reflecting one or more characters, a temporal relationship between the one or more characters, and a contextual relationship between the one or more characters. In some embodiments, the computer-implemented method may further comprise presenting one or more representations of one or more cameras, wherein use of the one or more cameras relative to the one or more characters spatially and temporally is reflected.

In some embodiments, the presentation of the VR environment comprises a two-dimensional (2D) map or a three-dimensional (3D) map including one or more elements represented within the script, and a spatial representation of the one or more elements set forth within the script. One or more cameras and a field of view of the one or more cameras within the 2D or 3D map may be presented. In some embodiments, the visual representation of at least one of a degree of closeness of two or more elements and an information intensity regarding the one or more elements may be presented.

In some embodiments, one or more notifications suggesting utilizing one or more of a visual or audio cue to direct audience attention to the two or more elements can be generated. In some embodiments, the VR environment can be adapted commensurate with the received interactive input comprises adapting a visual representation of the script in accordance with one or more changes to the one or more elements presented in the 2D or 3D map. Adapting the VR environment commensurate with the received interactive input may comprise adapting the 2D or 3D map in accordance with changes to a visual representation of the script.

In some embodiments, at least one of 3D and VR media content based upon at least one of the script and the 2D or 3D map can be generated.

In some embodiments, the script may be analyzed for at least one of structural and contextual validity commensurate with the VR experience. In some embodiments, at least one of a structural and contextual error based upon the analysis of the script can be identified. One or more notifications regarding the at least one of the structural and contextual error can be generated. In some embodiments, the one or more notifications can comprise a recommendation for rectifying the at least one of the structural and contextual error in accordance with the VR experience.

In accordance with one embodiment, an apparatus may comprise: a processor; and a memory unit operatively connected to the processor. The memory unit may comprise computer code adapted to cause the processor to: extract metadata from a text-formatted script indicative of one or more elements represented within the text-formatted script; generate a virtual reality (VR) map reflecting the one or more elements and one or more relationships existing between the one or more elements; and automatically adjusting at least one of a visual representation of the text-formatted script and the VR map in accordance with user input relating to the one or more elements.

The computer code adapted to cause the processor to extract the metadata and generate the VR map may cause the processor to extract the metadata and generate the VR map in accordance with a natural language processing scheme. The computer code may further cause the processor to present one or more notifications to a user of the apparatus, the one or more notifications comprising an identification of one or structural or contextual inconsistencies that would result in a VR experience generated in accordance with the text-formatted script. Further still, the computer code may further cause the processor to automatically generate a VR media content preview in accordance with the text-formatted script.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Various embodiments are directed to a system or set of software tools that provides scriptwriters with a workflow framework for developing (live-action/animation/cinematic) experiences using VR. Various embodiments may combine traditional scriptwriting methods with one or more aspects of theatre and stage production. For example, various embodiments may allow a scriptwriter, producer, or other user to develop aspects of the pre-production stages of VR filmmaking. Users may write scripts for live-action VR experiences, visualize a set/scene layout and preview the experience in a virtual mock-up of the live-action VR experiences. The script, layout (which may be a top-down view of the set/scene), and the VR experience preview (which may be a 3D preview viewed on a computer) may be presented in or as a frontend application or interactive user interface (UI). In some embodiments, the VR experience preview may be presented to a user through a headmounted display (HMD), a see-through display, a video see-through display, a laptop computer, a smartphone, a tablet, a mobile device, a projector, a monitor, a TV, and/or other displays.

Figure 1:
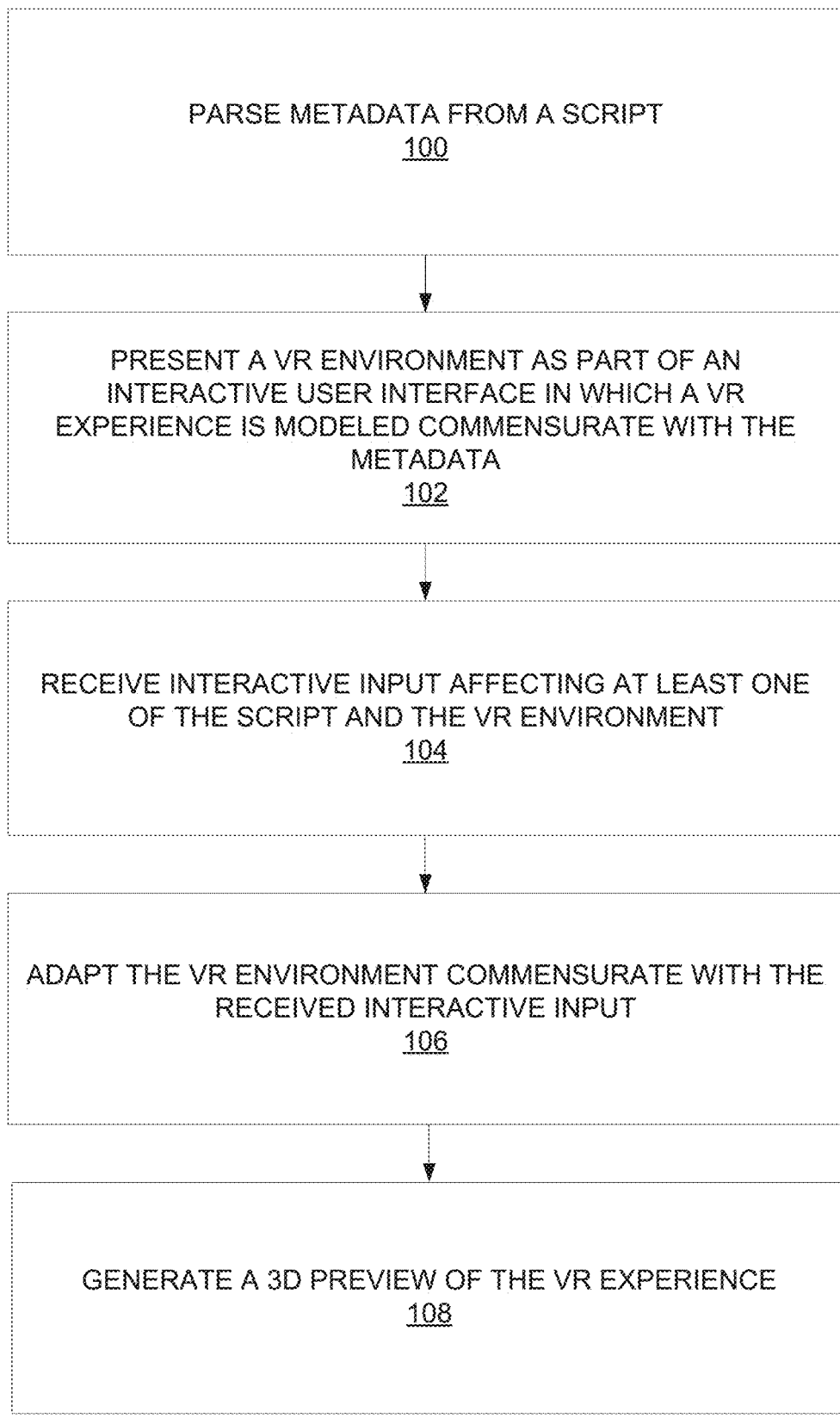
FIG. 1 is a flowchart of example operations that can be performed to provide a VR scriptwriting workflow in accordance with various embodiments.

FIG. 1 is a flow chart illustrating example operations that may be performed during the development of a VR experience in accordance with various embodiments. FIG. 1 may be described in conjunction with FIG. 3 which is a schematic representations of a system architecture in which the aforementioned workflow framework embodying various embodiments may be implemented.

Referring to FIG. 1, metadata from a script may be parsed at operation 100. A user may enter a script through or using frontend application/UI 302 (FIG. 3) either by typing the script in or by uploading a script into frontend application/UI 302. The script may be in a text format, and can be displayed on editing panel 304. Various embodiments can present or display the script in editing panel 304 in different ways, e.g., a traditional, linear script layout with additional features to assist in writing for a VR environment (described in greater detail below), as well as a quadrant view. In the quadrant view, the text of a script can be divided into vertical quadrants, each representing a 90 degree portion of a 360 degree view. Each quadrant may be associated with a different description or script.

In accordance with another embodiment, the script layout may comprise the presentation of the script in horizontal quadrants. This layout can be analogized to a musical score, where each stave may be representative of one camera (or one set of cameras') view, where each 90 degree portion of a 360 degree view can be filmed using one camera or set of cameras. In accordance with yet another embodiment, the script may be presented as a timeline, where each character may have a timeline representative of parts of the script during which the character speaks or engages in some action. The timeline can be presented horizontally or vertically. It should be noted that a user can select a desired layout, and may be given the ability to switch between one or more of the different layouts during the pre-production process and/or during a preview.

Frontend analytics engine 306 and/or backend analytics engine 312 may be used to parse the script. Frontend analytics engine 306 and backend analytics engine 312 may be resident on the same device or network, or they may be remotely located from each other. For example, frontend analytics engine 306 may be resident on a user device on which frontend application/UI 302 is implemented, while backend analytics may be implemented on a remotely located backend server 310, and connected to frontend application/UI 302 via one or more networks. The network may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof.

Depending on the complexity of the script, the type of analysis to be performed, and/or the processing power of a device or processor with which the frontend application/UI 302 is implemented, a particular analytics engine may be selected to operate on the script.

For example, frontend analytics engine 306 may be utilized to extract metadata from the script. That is, frontend analytics engine 306 may be programmed with natural language processing functionality such that it can analyze the text of a script and determine the existence of meaningful language, such as language indicative of characters, actions, interactions between characters, dialog, etc. For example, frontend analytics engine 306 may extract metadata indicative of a character, e.g., based on text determined or known to be a name. Frontend analytics engine 306 may extract metadata indicative of an action, e.g., based on text indicative of action, such as verbs. Frontend analytics engine 306 may extract metadata indicative of location, e.g., based on known names of locations (geographical and/or set location) or other textual location information found in the script.

However, backend analytics engine 312 may also be utilized to parse the script. Thus, backend analytics engine 312 may be used as a secondary check on the parsing performed by frontend analytics engine 306. For example, if the script contains large amounts of complex metadata, and backend analytics engine 312 can parse the script faster, backend analytics engine 312 may be utilized for parsing. If the script is in a language recognized only by backend analytics engine 312, again, backend analytics engine 312 may be utilized instead of frontend analytics engine 312. In some embodiments, frontend analytics engine 306 may be utilized to parse a script, while backend analytics engine 312 may be used to perform more intensive "story analytics" by checking for logical consistency vis-à-vis a compiler component 314 of backend analytics engine 312.

In order to train frontend analytics engine 306 and/or backend analytics engine 312, a logical, formal language can be developed using known words or most-used words to represent or indicate a character, location, action, etc. Using the natural language processing functionality, frontend analytics engine 306 and/or backend analytics engine 312 may discover and/or provide information that can be used by visualization engine 308 to generate a visualization of the script (described in greater detail below).

Additionally, using the natural language processing functionality, frontend analytics engine 306 and/or backend analytics engine 312 may build relationships between the extracted metadata commensurate with the logical, formal language developed in accordance with various embodiments. That is, backend analytics engine 312 may parse a script and determine that two characters A and B are present in a current scene. Based on additional extracted metadata indicative of some action in which characters A and B are engaged, determinations can be made/predicted regarding characters' emotional states, positions, relationships, etc. As alluded to above, various embodiments may compile a script(s) and check for logical inconsistencies. Determinations regarding whether or not logical inconsistencies exist may be determined on this extracted metadata which is used to build a contextual "world." Parsing in accordance with various embodiments can allow a visualization to be realized from a script as well as allow for a compilation to be checked and/or provide VR-related production suggestions.

It should be noted that both frontend and backend analytics engines 306 and 312 may access historical information regarding one or more aspects of the script or known information associated with the metadata in order to further enhance their ability to build the contextual world. For example, one or more of frontend and backend analytics engines 306 and 312 may access one or more data stores (an example of which may be embodied as a data library 320) containing information regarding a character's action and spoken history in previously produced media content that, e.g., the introduction of the character in a currently produced VR experience is contextually consistent. As will be discussed further below, data library 320 may contain further information that can be leveraged in accordance with other embodiments.

It should be noted that backend server 310 may comprise a script synchronization engine 316 and script storage 318, which may be one or more databases or data repositories. Script synchronization engine 316 may operate to synchronize one or more iterations of a script. For example, frontend application/UI 302 may be a web-based or standalone application that can be implemented on one or more devices simultaneously. This allows a user to develop a script using different devices. Script storage 318 may be used to store different iterations or versions of the script from the different devices. Script synchronization engine 316 may access different iterations or versions of a script in progress, compare the different iterations or versions, and update each accordingly so that the user is able to continue development of the script on any of his/her devices.

Referring back to FIG. 1, at operation 102, a VR environment can be presented as part of an interactive UI in which a VR experience is modeled commensurate with the metadata. At operation 104, interactive input affecting at least one of the script of the VR environment (or visualization) can be received. At operation 106, the VR environment (or visualization) can be adapted commensurate with the received interactive input. That is, various embodiments may present a visualization of the script entered by a user and parsed by frontend analytics engine 306 and/or backend analytics engine 312 via frontend application/UI 302. The visualization, as described above, may be a 2D top-down view of a scene(s), but other visualizations of the VR experience in frontend application/UI 302 may be used. A user may "run" a script and visually observe the resulting VR experience as an abstract 2D representation version of the VR experience.

The visualization can present different aspects of the script in real-time. For example, as a user is developing or editing a script via editing panel 304, visualization engine 308 may be receiving, from frontend and/or backend analytics engines 306 and 312, information gleaned from the parsed metadata. Visualization engine 308 may use this information to generate a 2D representation of the relevant aspects of the script. It should be noted that for simplicity's sake, visualization engine 308 may present abstract representations of the script components, e.g., characters, cameras, props, etc. As the user continues developing and/or editing the script, the 2D visualization of the VR environment can reflect the current development(s) and/or edits to the script.

In some embodiments, visualization engine 308 may present a 2D visualization in non-real time, such as if the user wishes to view the visualization of the script as developed/edited thus far. Visualization engine 308 may present a 2D enactment of the script in its current form. It should be noted that script storage 318 may also be used to store different iterations or versions of a script so that visualization engine 308 may access the different iterations or versions for presentation to the user. In this way, the user can see visualizations of the script in different forms or stages during development or editing.

Visualization engine 308 utilizes a visual metaphor language for generating the visualizations. Scene metadata (e.g., characters, props, and actions) may be extracted from the script as described above, and used to generate a first visualization. For example, a library of 3D models may be used, where the 3D models are parameterized in terms of visual appearance, or other parameters. This parametric representation may be referred to as a "smart object." Moreover, one or more catalogs of different kinds of interactions which may be possible between any two pairs of objects, which are referred to as "affordances" may be utilized. Metadata obtained from a script, for example, may be mapped to one or more instances of smart objects and corresponding affordances that are being invoked between them. In this way, one or more elements of a VR environment can be transformed from scene metadata to an actual visual representation.

Each character in the script (if present in a currently-presented scene) has a position in the visualization. The same holds true for props, and if necessary, equipment such as lights and/or cameras. The position of these scene elements can change over time. When users "run" the script, the visualization may dynamically update to show the movement of elements across, e.g., checkpoints creating an aforementioned 2D top-down preview. Checkpoints can refer to a reference time point. The preview can be viewed in real-time, slowed down, and/or sped up as desired. A preliminary timing check can be used. However, the timing of events in virtual space can be markedly different from that on 2D storyboards because, as described above, different characters, props, interactions, actions, etc., can be present/occurring in the 360 degree space of a VR environment. Accordingly, one or more of frontend and backend analytics engine 306 and 312 may adjust any event timing or timing checks for consistency among different aspects of a scene.

In some embodiments, a "heating map" may be generated. A heating map can refer to a visual representation of a script element's relationship to another script element. For example, a heating map can be used to represent how close a character is to a camera or another character. Information gleaned from such a heating map can provide direction to a user regarding the use of "call to action" hints. A call to action hint can refer to some cue directed to the audience that draws their attention to a particular part of the scene, e.g., a subtle increase in lighting that directs the audience's attention to some action or character or other element in that part of the scene. Other calls to action may include, but are not limited to the use of louder audio that directs the audience to the source of that audio. In some instances, heating map information can be used to inform the user or scriptwriter of an aspect of the scene that should be addressed by inserting dialog or having one or more characters engage in some action, etc.

As the user develops or edits the script and/or adjusts one or more aspects of the visualization, visualization engine 308 reflects the appropriate changes relative to the first visualization. It should be noted that changes can be effectuated by the user interacting with the script through editing panel 304. Additionally, the user may alter one or more aspects of a scene using the visualization itself as it is presented as part of the frontend application/UI 302 which is interactive. For example, the first visualization may reflect a current state of the script as set forth in editing panel 304. The user can then adjust the placement of objects, props, characters, as well the speed of the movement of those objects, props, and/or characters by interacting with the first visualization. Thus visualization engine 308 can generate a visualization based upon information or input from editing panel 304, where editing panel 304 may include a section for script editing, as well as a section for presenting and/or editing the visualization.

If the user wishes to add an object that was not identified during parsing of the script, it can be added manually (again through the visualization section of editing panel 304), after which frontend and/or backend analytics engines 306 and 312 will track all references to that object going forward. In some embodiments, frontend and/or backend analytics engines 306 and 312 can update the script in editing panel 304 to reflect any objects, characters, etc. added through a visualization and/or not identified during the metadata parsing stage. In some embodiments, a separate visualization panel or section separate from editing panel 304 may be used for presenting the visualization to the user (not shown). In some embodiments, aforementioned data library 320 may contain images of outfits associated with one or more characters, sketches (image and video), or any other relevant information or data that can be used to create and/or edit aspects of the script or visualization.

It should be noted that in some embodiments, the visualization can be used as a basis for creating an actual VR experience. That is, a user may associate the abstract representations of objects, props, characters, etc. with fully-realized digital representations, backgrounds can be added, etc. such that the visualization can be translated into actual media content. Technologies such as photogrammetry may be utilized to translate 2D content into 3D models/content for use in the VR experience.

Figure 3:
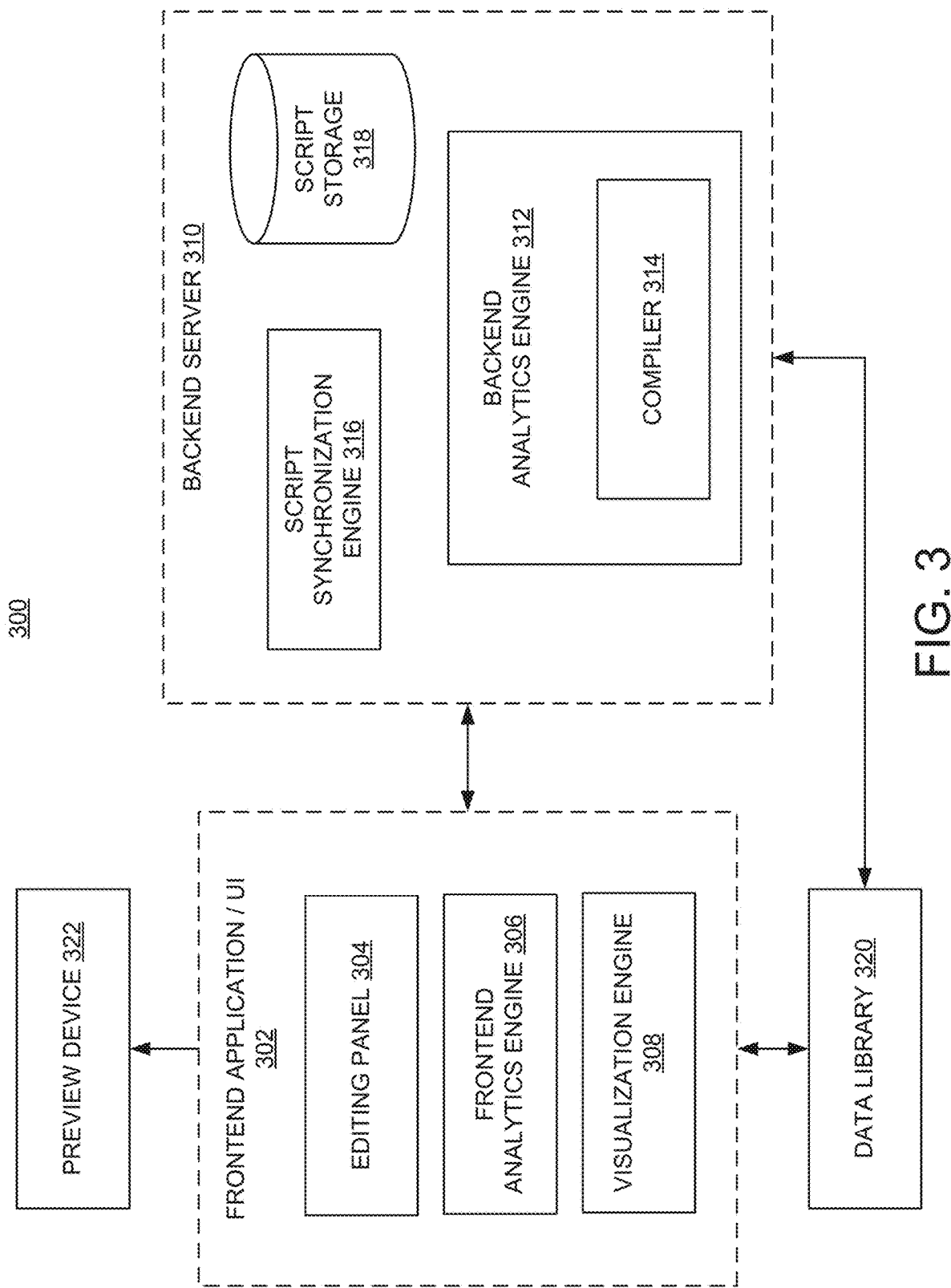
FIG. 3 is a schematic representation of a system architecture in which the VR scriptwriting workflow of FIG. 1 may be implemented.

Referring back to FIG. 1, and in addition to generating a 2D visualization of a script, at operation 108, a 3D preview of the VR experience may be generated and presented to the user. The 3D preview of the VR experience may be presented to a user through preview device 322 (FIG. 3). As discussed above, preview device 322 may be an HMD, a see-through display, a video see-through display, a laptop computer, a smartphone, a tablet, a mobile device, a projector, a monitor, a TV, and/or other displays.

The 3D preview may be generated based upon the visualization (similar to the manner in which the actual VR experience described previously is generated), except that the 3D preview may present the VR experience without the fully-realized representations. That is, the 3D preview may be presented using the abstract representations utilized in the 2D visualization. The 3D preview may be used to assess the VR experience in terms of contextual and/or thematic cohesiveness, consistency, aesthetic appeal, etc. For example, a writer may present the 3D preview to a potential producer, or a director may present the 3D preview to one or more actors. The director may view the 3D preview in advance of an actual rehearsal in terms of a live action movie, or prior to animating characters, scene elements, etc. for an animated production. In some embodiments, the 3D preview may be presented to the user instead of the 2D top-down visualization during script development/editing.

Figure 2:
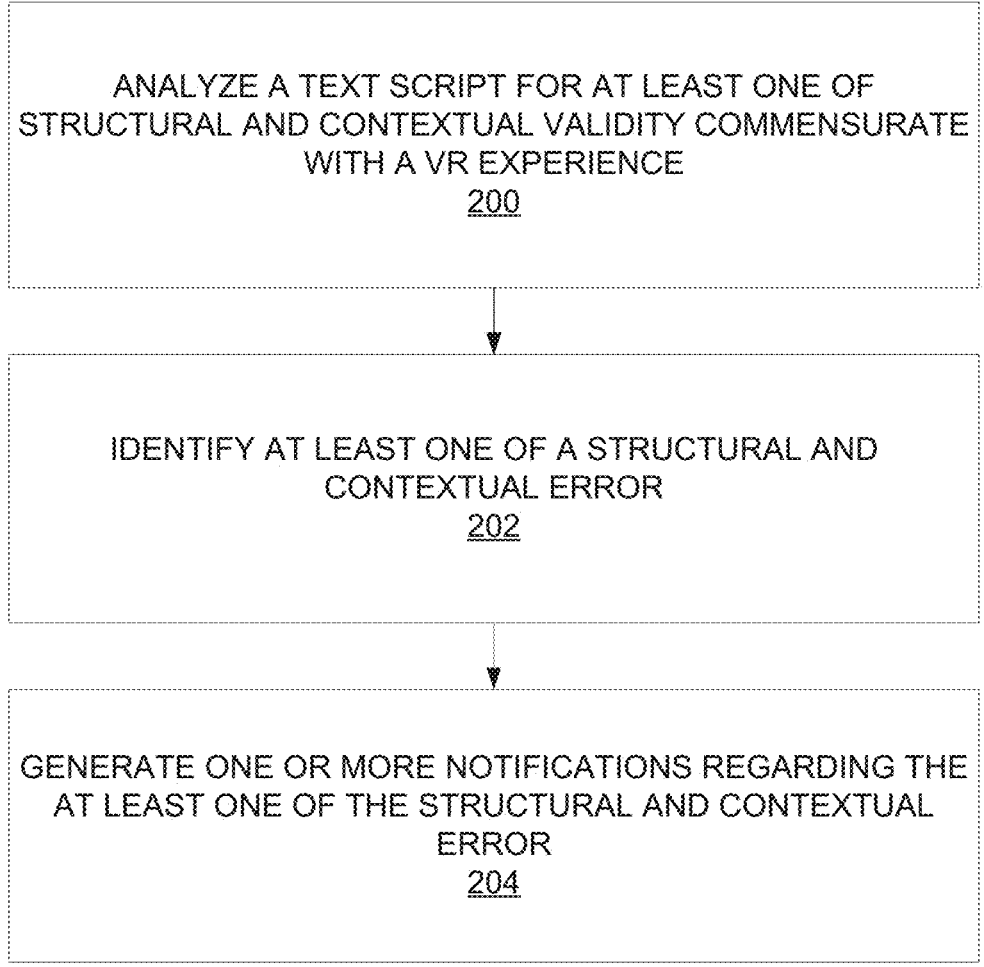
FIG. 2 is a flowchart of example operations that can be performed to analyze and generate notifications regarding structural and/or contextual consistency in a VR experience that is based on a script in accordance with various embodiments.

FIG. 2 is a flow chart illustrating example operations that can be performed by, e.g., compiler 314 of backend analytics engine 312, to analyze a script for consistency and provide recommendations for addressing any inconsistencies. At operation 200, a text script, e.g. one entered into or uploaded via frontend application/UI 302, can be analyzed for structural and/or contextual validity commensurate with a VR experience. That is, a script may be analyzed for any logical inconsistencies. The script may be analyzed from a "linear" or traditional 2D experience perspective as well as from a VR experience perspective.

For example, compiler 314 may receive information regarding the metadata extracted from the script as well as any information or data derived therefrom from frontend analytics engine 306 and/or backend analytics engine 312. Compiler 314 may utilize this information to check a current iteration or version of the script for structural validity. For example, based on the same logical, formal language utilized by frontend analytics engine 306 and/or backend analytics engine 312, compiler 314 can determine whether or not any structural errors are present. In some embodiments, another type of formal language may be utilized. A structural error can refer to errors associated with "physical" representations, e.g., errors in camera placement, prop placement, and the like, that are not physically realizable in a scene. An example of a structural error can be a scenario where a camera "goes through" a prop—this is not possible, and should be identified. Compiler 314 may also determine whether or not any contextual errors are present. A contextual error can refer to story-based inconsistencies, e.g., the user has a particular character speaking in a scene, where that character has not yet made an entrance in that scene, or the character was killed off in a previous scene.

At operation 202, at least one of a structural error and a contextual error is identified. At operation 204, (based upon this identification of a structural and/or contextual error), compiler 314 may generate one or more notifications regarding the error. The one or more notifications may simply be notifications that inform the user that an inconsistency exists, as well as where, and/or what aspect(s) or element(s) of the script is involved. In some embodiments, the one or more notifications may be recommendations to the user regarding solutions to rectify the inconsistency. For example, backend analytics engine 312 may, from the parsed metadata, determine that an interaction exists between two or more characters in a particular portion of a scene. Compiler 314 may analyze this information and determine that a call to action cue should be provided to the audience based upon this existing interaction. Accordingly, compiler 314 generates a notification suggesting that the user insert a call to action cue, such as a lighting change or audio cue to direct the audience to that interaction.

It should be noted that the script developed/edited in frontend application/UI 302, as well as the 2D or 3D visualization, as well as the 3D preview or VR experience produced in accordance with various embodiments can be output in a convenient and/or easy-to-share format. For example, VR content can be provided in known, accepted media formats such that the VR content can be rendered in available devices, such as preview device 322 which can be an existing HMD or other display. The script, once developed can be provided in a text format that can be rendered by known word processing or other text-editing software. The format of the 2D visualization or preview may be in known media formats, such as the mp4 or avi formats.

FIGS. 4A-4G are example representations of frontend application/UI 302 illustrating the functionality therein in accordance with various embodiments. Other functionality, as described above is contemplated, but may not be illustrated for ease of reference.

Figure 4A:
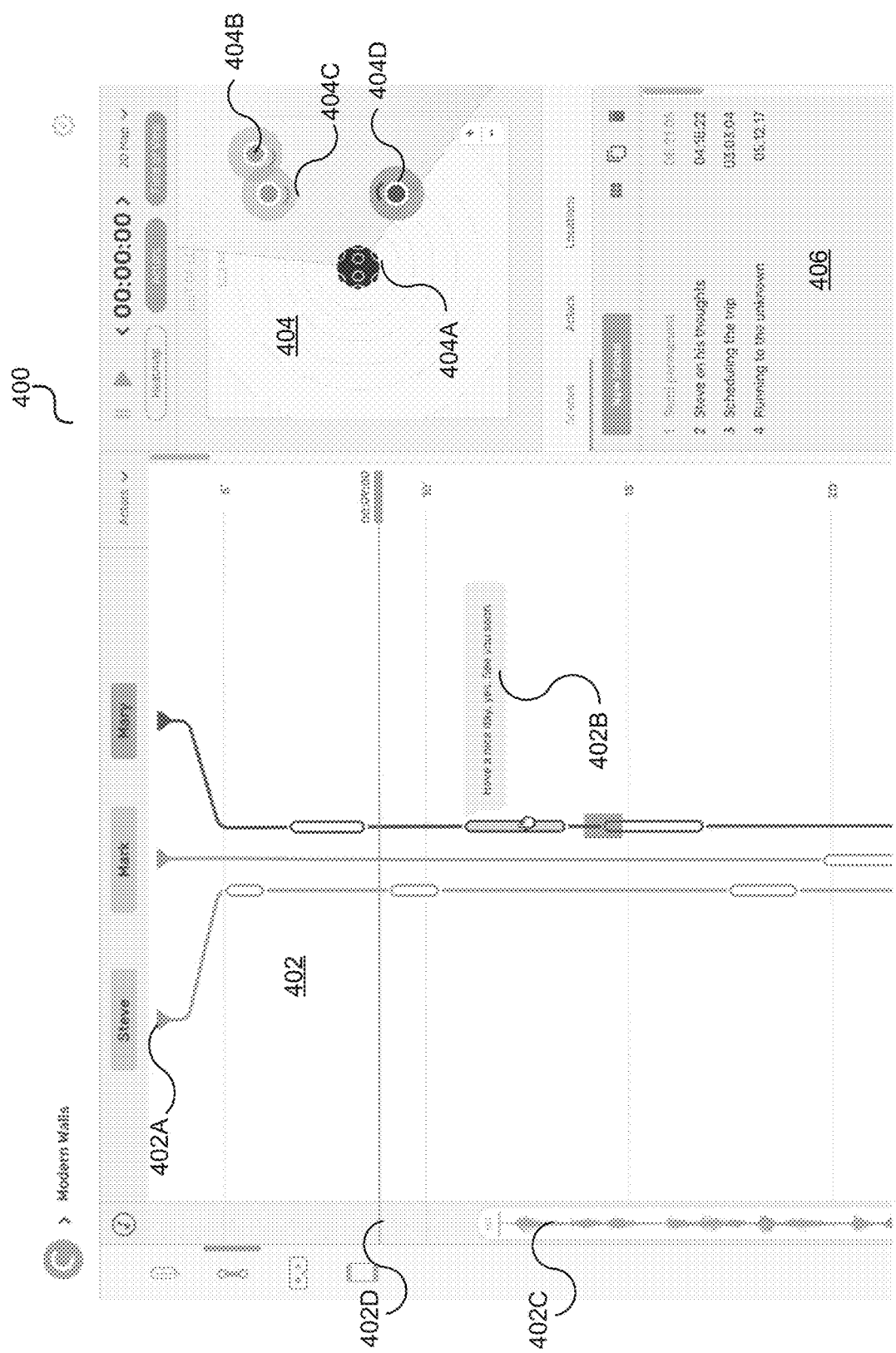
FIGS. 4A-4G illustrate example functionality provided by a user interface of the VR scriptwriting workflow of FIG. 1.

FIG. 4A illustrates an example UI 400, which may be an embodiment of frontend application/UI 302, in accordance with various embodiments. Frontend application/UI 302 may comprise an editing panel 402 that includes one or more character timelines, an example of which is character timeline 402A, a 2D visualization 404, and a UI control panel 406. "Bubble" 402B may represent dialog to be spoken by a character in the particular scene represented in editing panel 402. The user may have entered this dialog, or it may have already been present, and the user is checking to see what dialog is associated with a particular character at a particular point in time in the scene. Element 402C presents background audio to a user. 2D visualization 404 can include the characters currently present in the scene rendered as an abstract representation, e.g., elements 404B-404D.

It should be understood that the user may manipulate one or more aspects of UI 400, e.g., the character timelines, by selecting and, e.g., dragging a character timeline in accordance with the user's desired effect. For example, when character timelines are brought together or near each other, it is indicative of the represented characters engaging either other through scripted dialog or action(s). Different representations indicating the presence or exit of a character in or from a scene can be presented. For example, a solid timeline can indicate the presence of a character, whereas a dotted timeline can indicate that the character has left the scene.

A camera may also be rendered as an abstract representation 404A. The field of view or proposed shooting direction(s) of the camera can be shown relative to the characters. UI control panel 406 can be utilized by the user to switch between controlling different aspects of the script or visualization, along with relevant information associated with those aspects, such as times or frames commensurate with an action or dialog involving a character, etc.

A timeline controller 402D may be used by the user to "scroll" through a script in editing panel 402. The 2D visualization 404 and the UI control panel 406 can reflect the relevant aspects of the script depending on where the timeline controller 402D is scrolled.

Figure 4B:
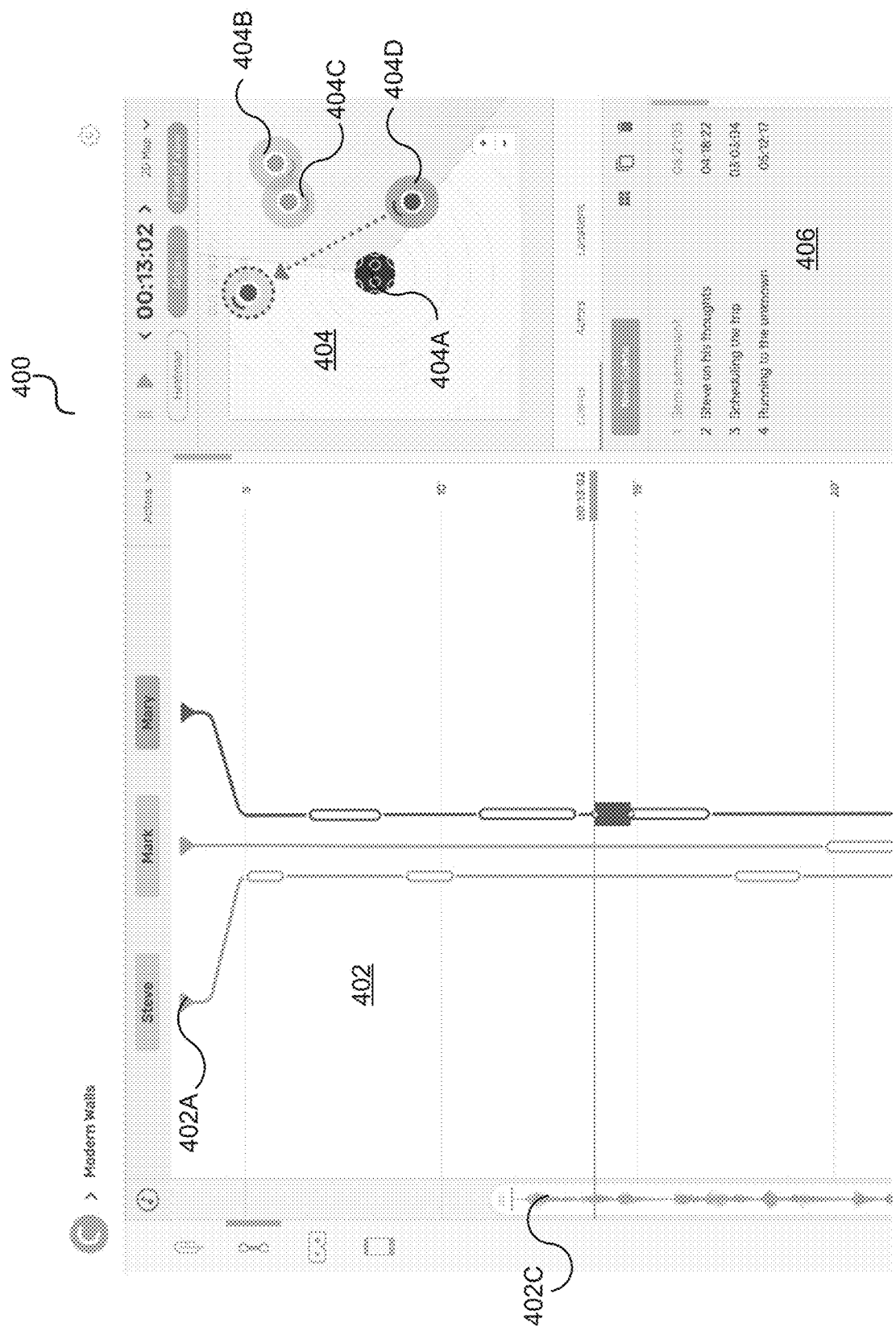
Figure 4C:
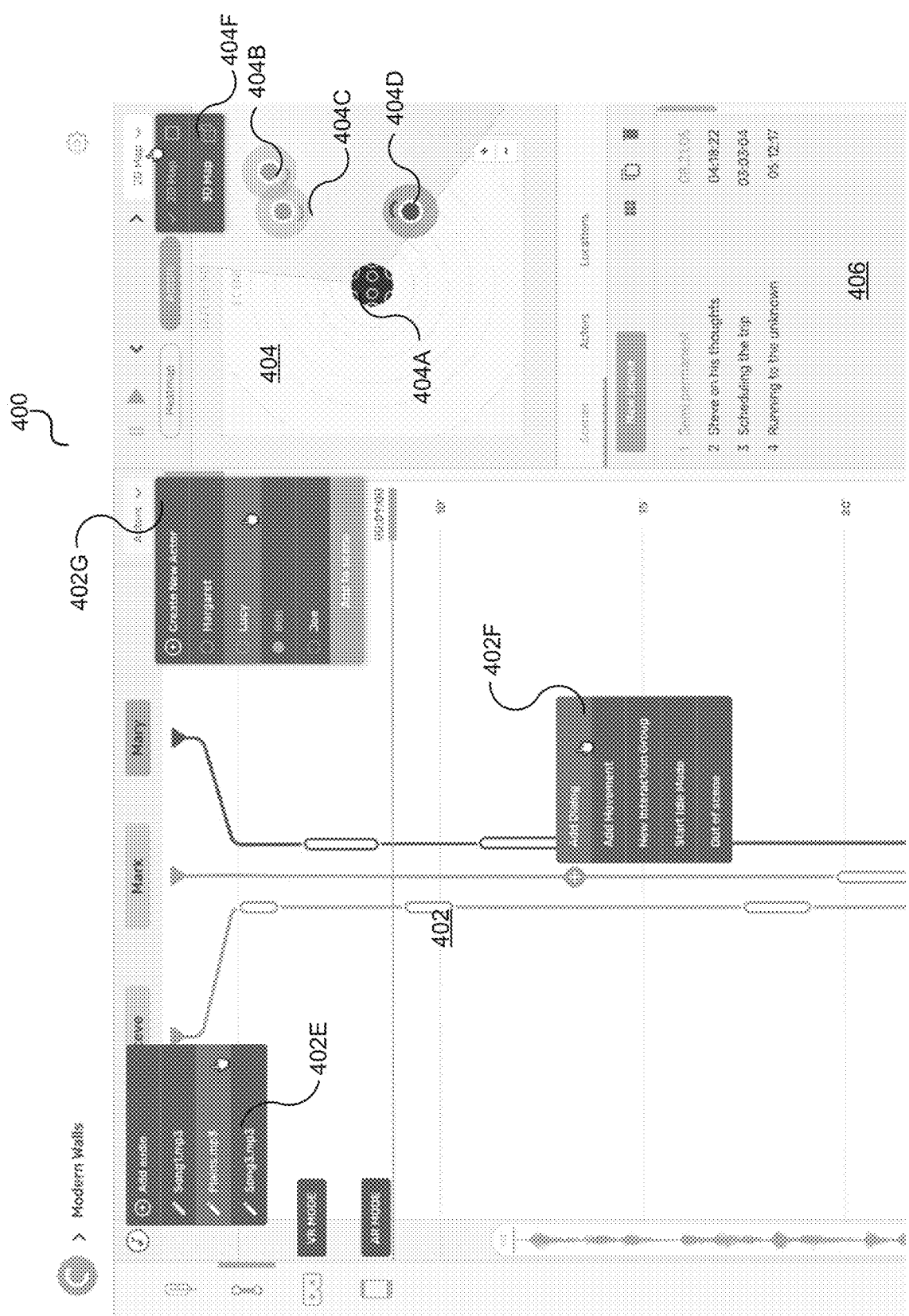

FIG. 4B illustrates an example of a user manipulating a character 404D's placement or movement within a scene. FIG. 4C illustrates examples of some of the editing capabilities that can be utilized by the user. For example, the user may add audio through an audio editing option popup window 402E. The user may add a new character through a character editing option popup window 402G. The user may add an additional/new dialog, action(s), or interaction(s) using popup window 402F. Within each of these options, sub-options can also be provided. With regards to the 2D visualization 404, the user may toggle between the 2D visualization 404 and a 3D visualization or map by making a selection in visualization popup window 404F.

Figure 4D:
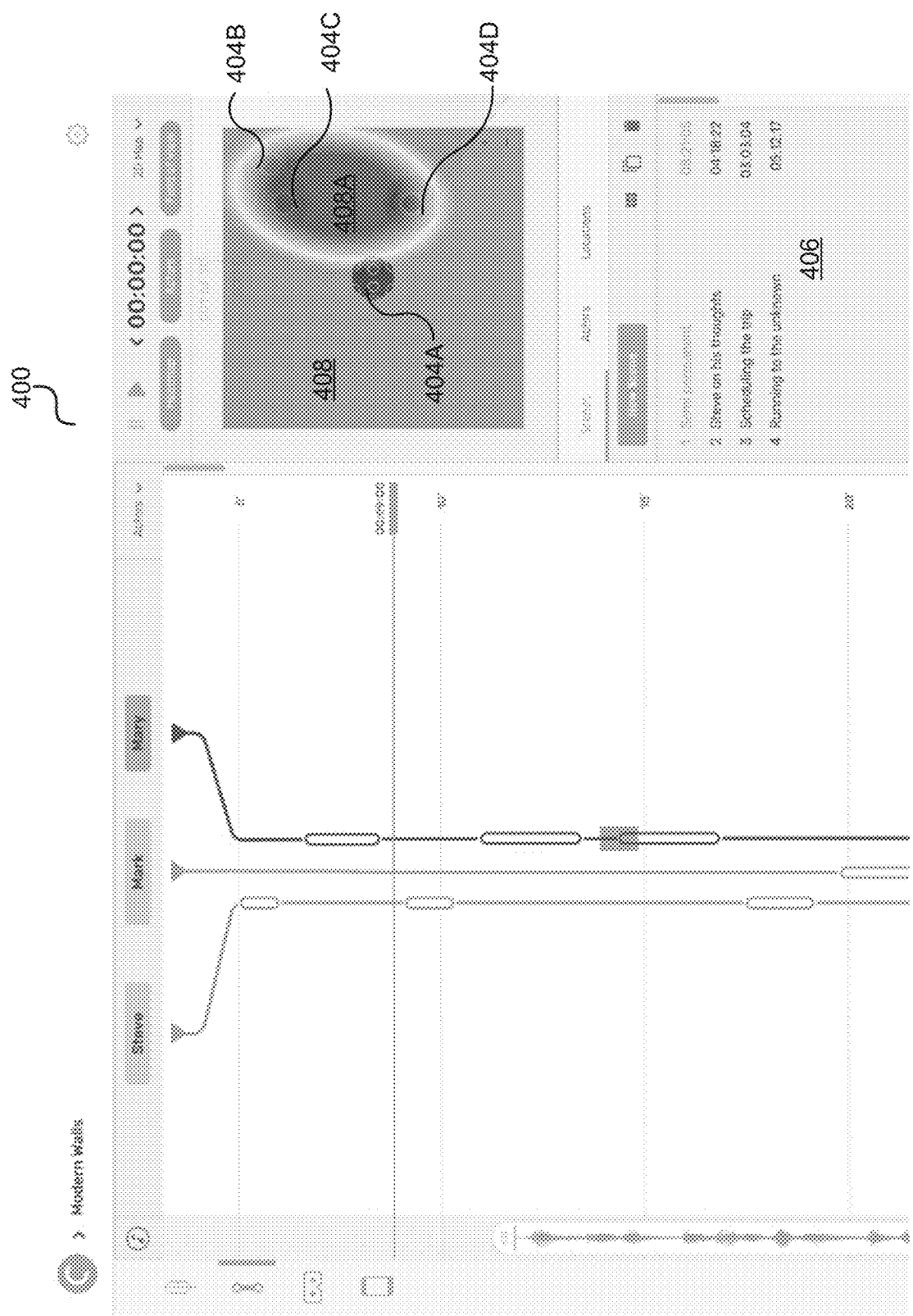

FIG. 4D illustrates an example of the heating map functionality described above. A heating map 408 can be generated in conjunction with the 2D visualization 404 (or in a 3D visualization). In this example, color can be used to indicate the closeness of two or more aspects or elements of the scene, however, other methods of indicating closeness can be utilized. In this example, the heating map indicates a relationship 408A between characters 404C and 404D that should be addressed by the user with, e.g., a call to action. In some embodiments, colors in the yellow, orange, and red spectrums can suggest levels or grades of closeness, whereas colors in the blue or green spectrums suggest a lack of closeness. It should be understood that the heating map can reflect any type of relevant information besides just closeness. For example, action or movement, as well as sound can be reflected in a heating map, where different colors can be used to represent gradations or levels of reflecting the intensity or amount of action, movement, sound, etc. In some embodiments, colors of the heating map can be used to indicate how much information can be consumed by a viewer at a given camera position in the scene.

Figure 4E:
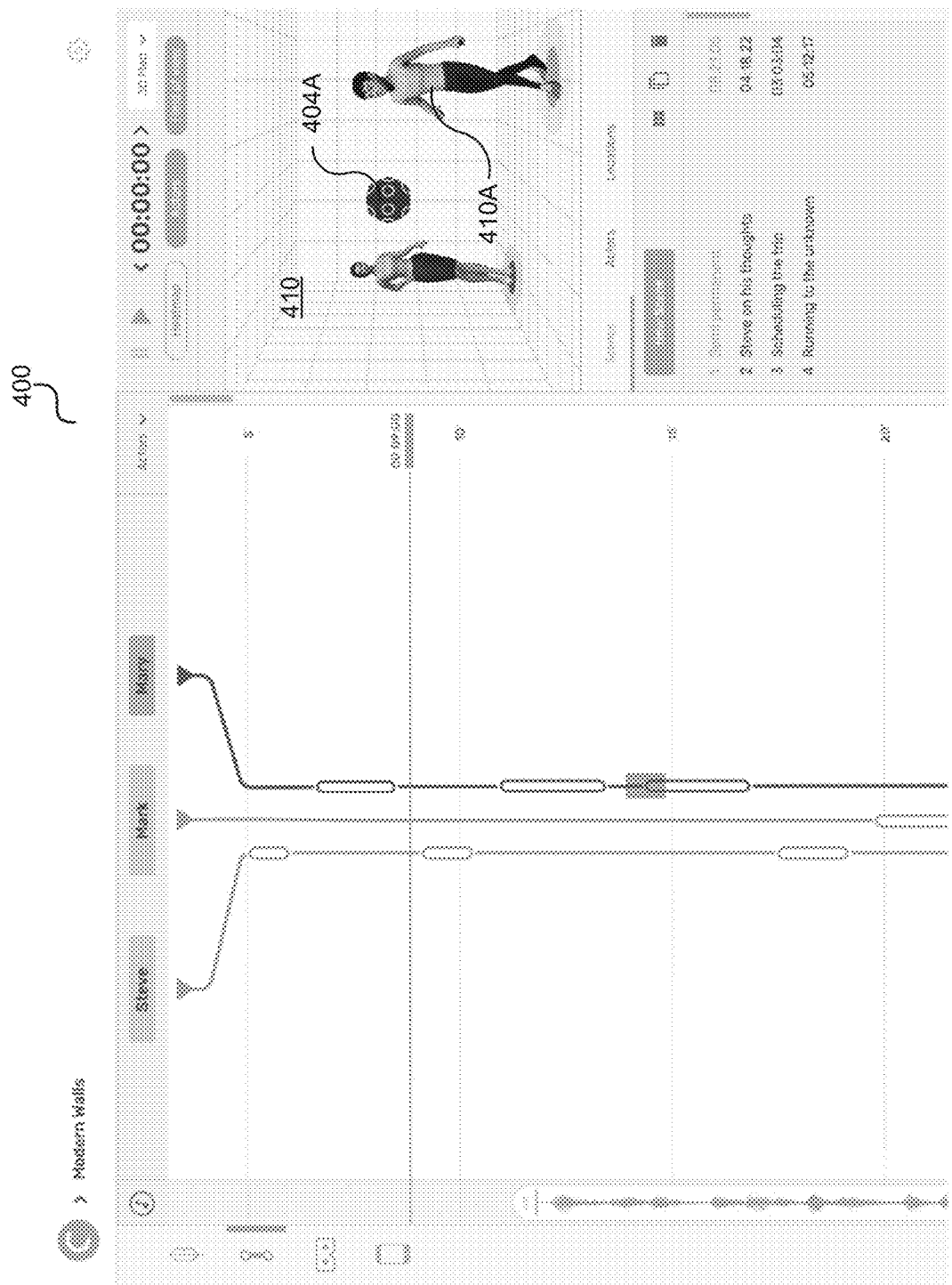

FIG. 4E illustrates an example of a 3D visualization or map 410. In this example, the user may have chosen to associate a particular image 410A with a particular character. The user may access a data store of images that can be dragged and dropped onto the 3D visualization 410. Alternatively, the user may use image 410A as a prop/background element or character.

Figure 4F:
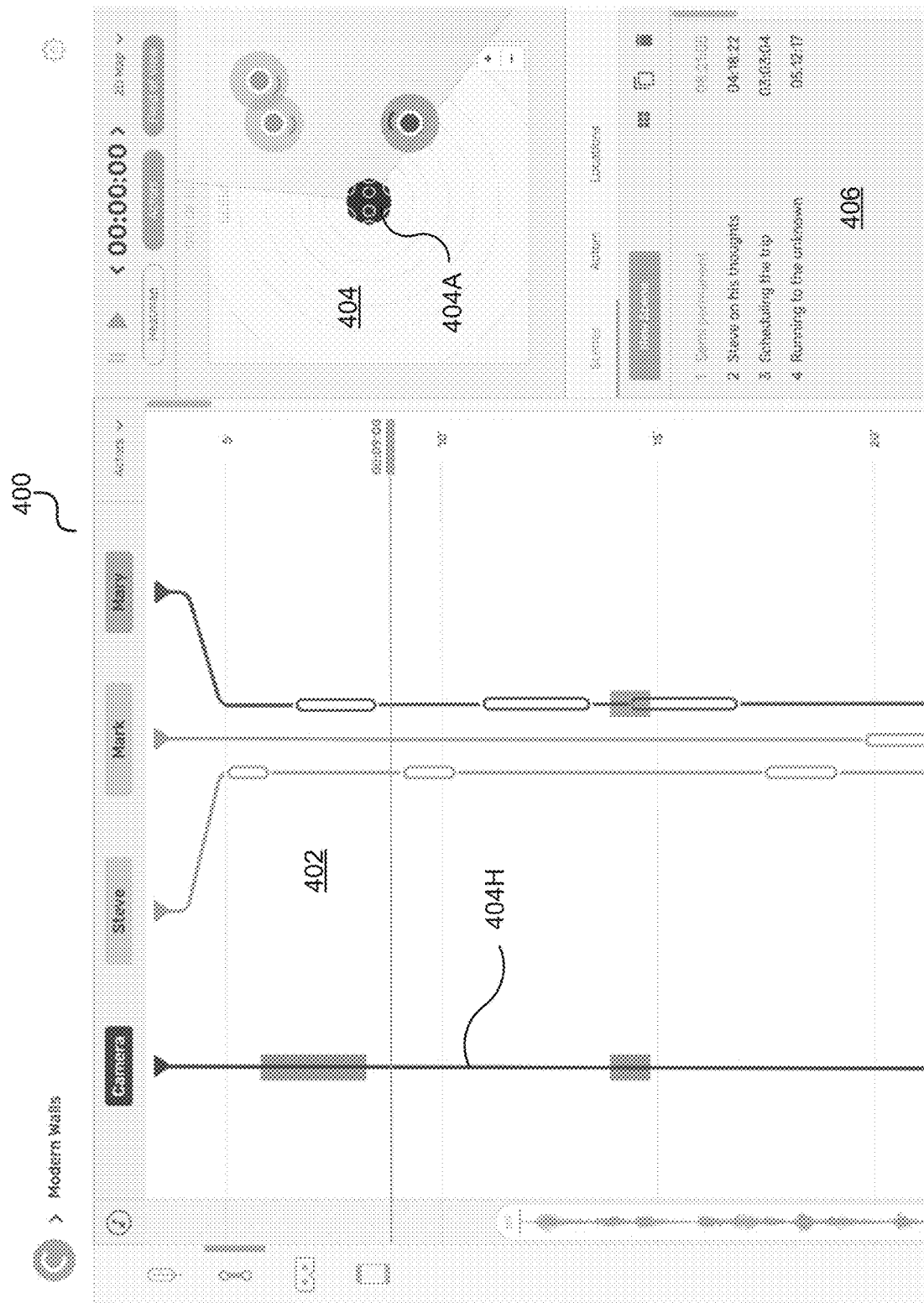

FIG. 4F illustrates an example representation of camera 404A (shown in 2D visualization 404) in the timeline area of editing panel 402. In the timeline, camera 404A may be represented with its own timeline representation 404H. In this way, the user has multiple ways of interacting with/adjusting a camera in UI 400.

Figure 4G:
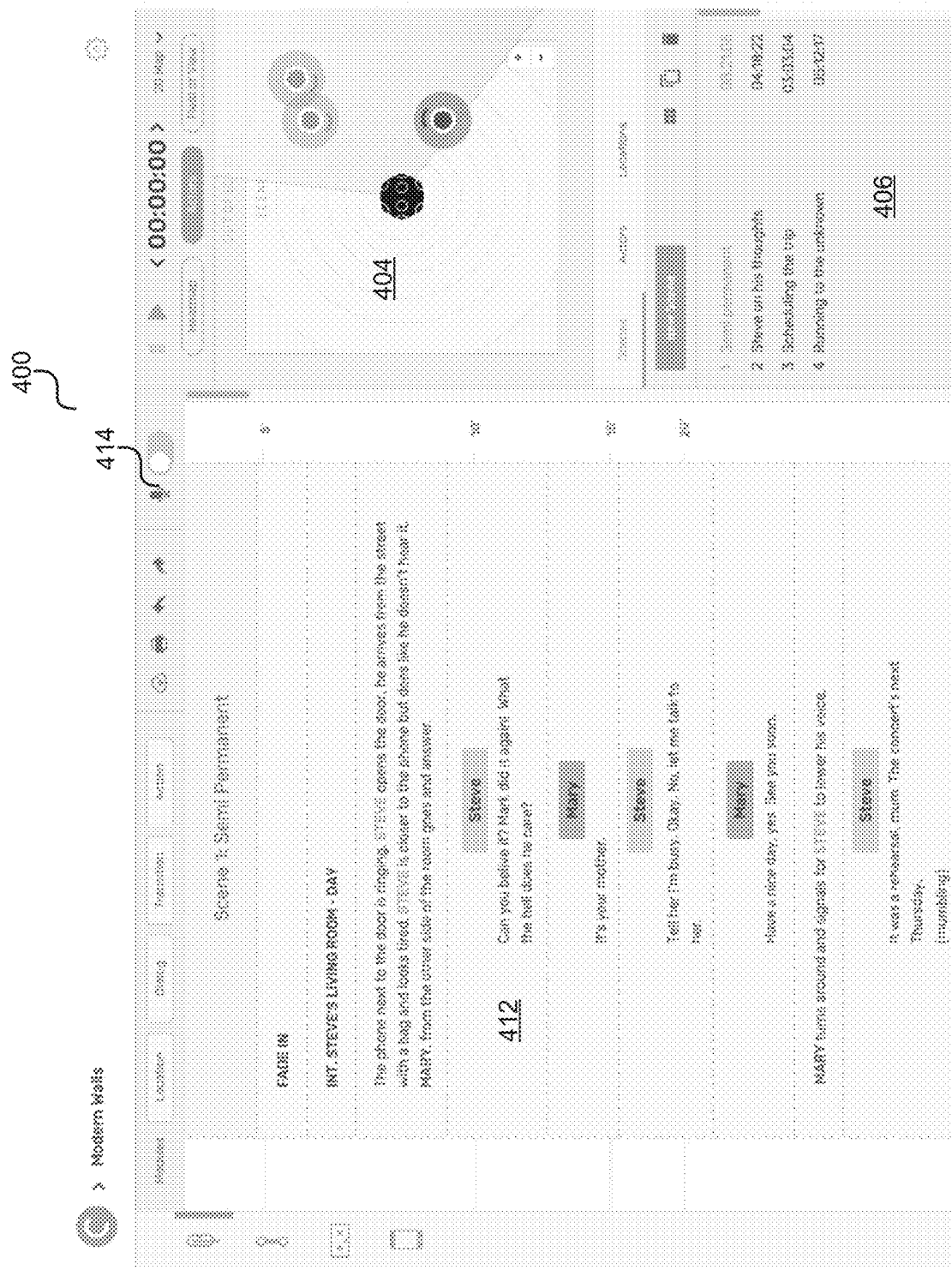

FIG. 4G illustrates an example representation of the script 412 in text form presented in editing panel 402. Accordingly, the user can add, edit, delete, and/or view the script in a more traditional text layout as opposed to the timeline layout of FIGS. 4A-4H. If the user wishes to hear spoken dialog, an option to listen to audio dialog can be selected in the "dialog" view using option 414 (FIG. 4G).

Conventional tools available to scriptwriters can be ill-adapted for use in generating VR or 3D content. Conventional tools provide limited ways to model scripts and VR environments. Conventional tools also often require significant technical know-how to set up a full VR environment.

Moreover, no conventional tools allow for a virtual mock-up of a script to be generated automatically from textual scripts through the use of metadata.

Accordingly, various embodiments provide a full workflow, e.g., from writing a script to visualizing the script, editing the layout of scene elements to previewing the experience in 3D/in a VR environment. Various embodiment providing an efficient and intuitive way to mock-up the VR experience in 3D, even for non-developer users if you're not a developer. The use of experimental rehearsals required to perfect a shoot can be reduced, which in turn can cut down on the cost of production. Additionally, because the timing of events is markedly different between traditional, linear storyboards and the actual VR experience, testing a prototype experience can be beneficial to creating successful/pleasing content.

Figure 5:
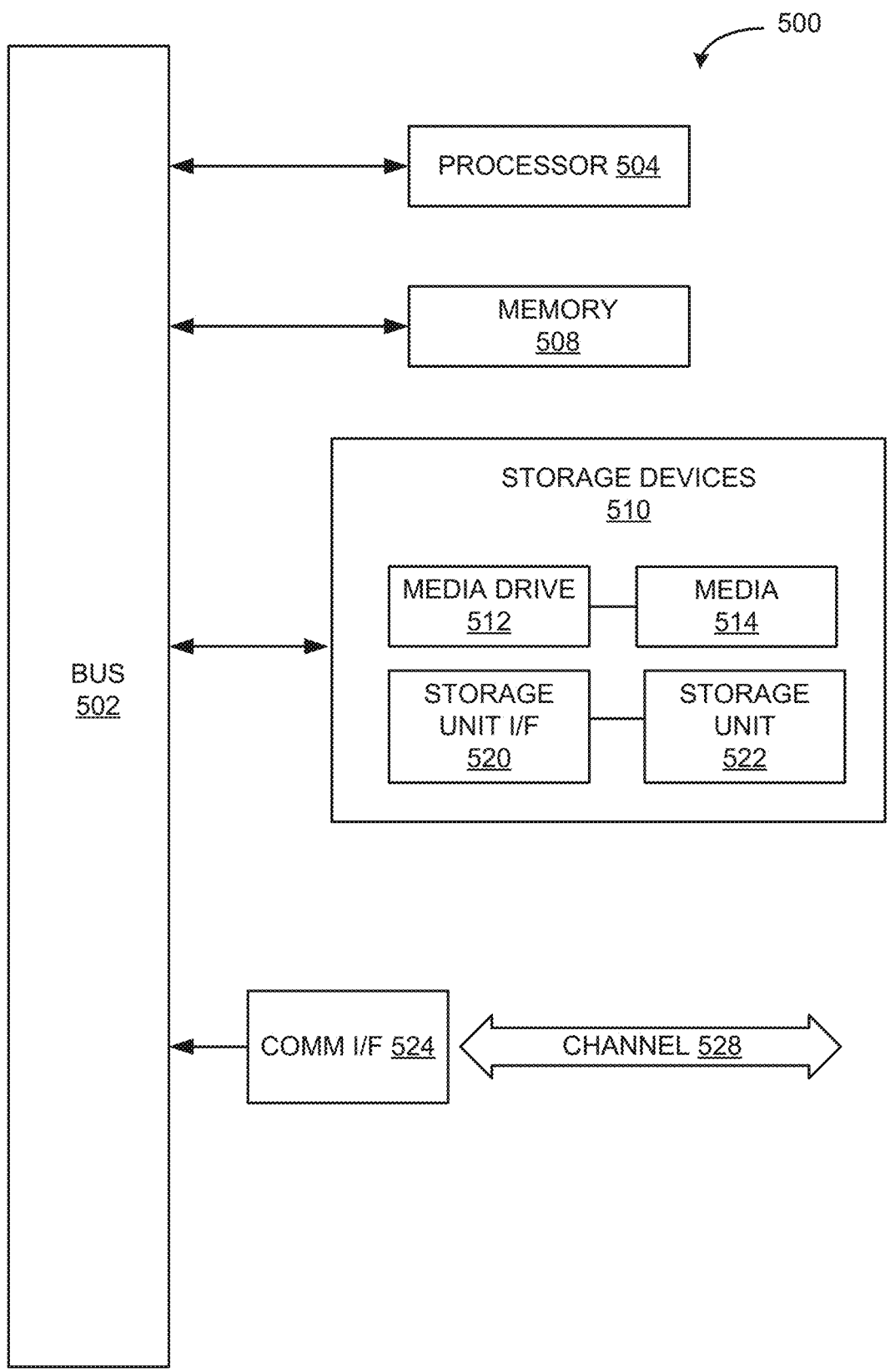
FIG. 5 is an example computing component that may be used to implement various features of embodiments described in the present disclosure.

FIG. 5 illustrates an example computing component that may be used to implement various features of the system and methods disclosed herein, for example, one or more elements of system 300, such as a user device in which frontend application/UI 302 may be implemented, backend server 310, data library 320, preview device 322, etc.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example navigation systems, portable computing devices, and other electronic devices that might include some form of processing capability.

Computing component 500 might include, for example, one or more processors, controllers, control components, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing component 500 or to communicate externally.

Computing component 500 might also include one or more memory components, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 514 might include, for example, a hard disk, an integrated circuit assembly, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot, a PCMCIA slot and card, and other fixed or removable storage units 522 and interfaces 520 that allow software and data to be transferred from the storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for editing content for presentation in a virtual-reality (VR) environment, the method comprising:
receiving, via a plurality of views representing different contiguous view portions into which a 360 degree view spanned by the VR environment is divided, one or more edits to metadata associated with a script, wherein each view includes a different subset of the script, and wherein the different subset of the script is associated with a corresponding contiguous view portion of the 360 degree view spanned by the VR environment;
generating a model of the VR environment based on the metadata;
receiving, via manipulation of one or more components of a two-dimensional (2D) visualization of the script, a modification to the model of the VR environment that alters at least one element of the model of the VR environment, wherein the 2D visualization comprises a layout of one or more characters and a camera associated with a given scene;
generating a modified model of the VR environment based on the modification to the model of the VR environment;
updating the script based on the modified model of the VR environment;
generating a three-dimensional (3D) preview of the VR environment based on the modified model of the VR environment; and
presenting the 3D preview to a user.

2. The method of claim 1, wherein the model of the VR environment includes a timeline view showing characteristics of the at least one element of the model of the VR environment over time.

3. The method of claim 1, further comprising:
receiving the script at a first device;
receiving a modified version of the script at the first device; and
synchronizing the script and the modified version of the script.

4. The method of claim 1, wherein the modification to the model of the VR environment comprises a dynamic update to the model of the VR environment, and wherein the dynamic update is based on the metadata.

5. The method of claim 1, further comprising generating a heat map representing a proximity between two elements of the model of the VR environment.

6. The method of claim 1, further comprising generating a visual representation of the camera and a field of view of the camera that are associated with the model of the VR environment, and wherein receiving the modification to the model of the VR environment comprises receiving a user input that adjusts the visual representation of the camera.

7. The method of claim 1, wherein generating the modified model of the VR environment comprises modifying a speed of motion associated with the at least one element of the model of the VR environment.

8. The method of claim 1, wherein generating the modified model of the VR environment comprises automatically analyzing, based on the metadata, the script to identify one or more contextual errors associated with the script, and automatically generating one or more notifications to correct the one or more contextual errors.

9. The method of claim 1, wherein generating the modified model of the VR environment comprises generating, based on the metadata, a notification that the at least one element or at least one action should be added to the model of the VR environment.

10. A method for editing content for presentation in a virtual-reality (VR) environment, the method comprising:
parsing a script to obtain metadata associated with the script;
generating a model of the VR environment based on the metadata;
receiving, via manipulation of one or more components of a two-dimensional (2D) visualization of the script, a modification to the model of the VR environment that alters at least one element of the model of the VR environment, wherein the 2D visualization comprises a layout of one or more characters and a camera associated with a given scene;
generating a modified model of the VR environment based on the modification to the model of the VR environment;
generating a notification that a call to action hint should be added to the modified model of the UR environment, wherein the call to action hint comprises at least one of changing a lighting in the VR environment or changing an audio intensity in the VR environment;
updating the script based on the modified model of the VR environment;
generating a three-dimensional (3D) preview of the VR environment based on the modified model of the VR environment; and
presenting the 3D preview to a user.

11. One or more non-transitory computer-readable media storing program instructions that, when executed by one or more processors, cause the one or more processors to edit content for presentation in a virtual-reality (VR) environment by performing the steps of:
receiving, via a plurality of views representing different contiguous view portions into which a 360 degree view spanned by the VR environment is divided. one or more edits to metadata associated with a script, wherein each view includes a different subset of the script, and wherein the different subset of the script is associated with a corresponding contiguous view portion of the 360 degree view spanned by the VR environment;
generating a model of the VR environment based on the metadata;
receiving, via manipulation of one or more components of a two-dimensional (2D) visualization of the script, a modification to the model of the VR environment that alters at least one element of the model of the VR environment, wherein the 2D visualization comprises a layout of one or more characters and a camera associated with a given scene;
generating a modified model of the UR environment based on the modification to the model of the VR environment;
updating the script based on the modified model of the VR environment; and
generating a three-dimensional (3D) preview of the VR environment based on the modified model of the VR environment for display.

12. The one or more non-transitory computer-readable media of claim 11, wherein the model of the VR environment includes a timeline view showing characteristics of the at least one element of the model of the VR environment over time.

13. The one or more non-transitory computer-readable media of claim 11, wherein the instructions further cause the one or more processors to perform the steps of:
receiving the script and a modified version of the script;
storing the script and the modified version of the script; and
updating the script or the modified version of the script based on development of the script or the modified version of the script on one or more devices.

14. The one or more non-transitory computer-readable media of claim 11, wherein the modification to the model of the VR environment comprises a dynamic update to the model of the VR environment, and wherein the dynamic update is based on the metadata.

15. The one or more non-transitory computer-readable media of claim 11, wherein the instructions further cause the one or more processors to perform the step of generating a heat map representing a proximity between two elements of the model of the UR environment.

16. The one or more non-transitory computer-readable media of claim 11, wherein the instructions further cause the one or more processors to perform the step of generating a visual representation of the camera and a field of view of the camera that are associated with the model of the VR environment, and wherein receiving the modification to the model of the VR environment comprises receiving a user input that adjusts the visual representation of the camera.

17. The one or more non-transitory computer-readable media of claim 11, wherein the instructions further cause the one or more processors to perform the step of generating a notification that a call to action hint should be added to the modified model of the VR environment, wherein the call to action hint comprises at least one of changing a lighting in the VR environment or changing an audio intensity in the VR environment.

18. The one or more non-transitory computer-readable media of claim 11, wherein generating the modified model of the VR environment comprises modifying a speed of motion associated with the at least one element of the model of the VR environment.

19. The one or more non-transitory computer-readable media of claim 11, wherein generating the modified model of the VR environment comprises:
automatically analyzing, based on the metadata, the script to identify one or more contextual errors associated with the script; and
automatically generating one or more notifications to correct the one or more contextual errors, or
generating, based on the metadata, a notification that the at least one element or at least one action should be added to the model of the VR environment.

20. A system, comprising:

one or more memories storing program instructions; and one or more processors that are coupled to the one or more memories and, when executing the program instructions, are configured to:
- receive, via a plurality of views representing different contiguous view portions into which a 360 degree view spanned by a virtual-reality (VR) environment is divided, one or more edits to metadata associated with a script, wherein each view includes a different subset of the script, and wherein the different subset of the script is associated with a corresponding contiguous view portion of the 360 degree view spanned by the VR environment;
- generate a model of the VR environment based on the metadata;
- receive, via manipulation of one or more components of a two-dimensional (2D) visualization of the script, a modification to the model of the VR environment that alters at least one element of the model of the VR environment, wherein the 2D visualization comprises a layout of one or more characters and a camera associated with a given scene;
- generate a modified model of the VR environment based on the modification to the model of the VR environment;
- update the script based on the modified model of the VR environment; and
- generate a three-dimensional (3D) preview of the VR environment based on the modified model of the VR environment for display.

* * * * *

UNITED STATES PATENT AND TRADEMARK OFFICE
CERTIFICATE OF CORRECTION

| | |
|---|---|
| PATENT NO. | : 11,721,081 B2 |
| APPLICATION NO. | : 16/796842 |
| DATED | : August 8, 2023 |
| INVENTOR(S) | : Sasha Anna Schriber et al. |

It is certified that error appears in the above-identified patent and that said Letters Patent is hereby corrected as shown below:

In the Claims

Column 15, Claim 10, Line 36, please delete "UR" and insert --VR--;

Column 15, Claim 11, Line 53, please delete "divided." and insert --divided,--;

Column 16, Claim 11, Line 1, please delete "UR" and insert --VR--;

Column 16, Claim 15, Line 34, please delete "UR" and insert --VR--.

Signed and Sealed this
Third Day of October, 2023

Katherine Kelly Vidal
*Director of the United States Patent and Trademark Office*